United States Patent
Khokhar et al.

(10) Patent No.: US 10,547,645 B1
(45) Date of Patent: Jan. 28, 2020

(54) PUBLIC-PRIVATE COMPUTING SYSTEM

(71) Applicant: EMC IP Holding Company, LLC, Hopkinton, MA (US)

(72) Inventors: Muzhar Khokhar, Shrewsbury, MA (US); Shyam Reddy, Westborough, MA (US); Vamshi Challa, Westborough, MA (US); Bhaswati Neog, Bangalore (IN)

(73) Assignee: EMC IP Holding Company, LLC, Hopkinton, MA (US)

( * ) Notice: Subject to any disclaimer, the term of this patent is extended or adjusted under 35 U.S.C. 154(b) by 81 days.

(21) Appl. No.: 15/644,410

(22) Filed: Jul. 7, 2017

(51) Int. Cl.
*H04L 29/06* (2006.01)
*G06F 9/54* (2006.01)
*G06F 9/455* (2018.01)

(52) U.S. Cl.
CPC .......... *H04L 63/20* (2013.01); *H04L 63/0281* (2013.01); *H04L 63/166* (2013.01); *G06F 9/45558* (2013.01); *G06F 9/54* (2013.01); *G06F 2009/45587* (2013.01); *H04L 63/10* (2013.01); *H04L 63/105* (2013.01)

(58) Field of Classification Search
CPC ... H04L 63/08; H04L 63/0861; H04L 63/083; H04L 63/10; H04L 63/105; H04L 63/14; H04L 63/20; H04L 29/08072; H04L 29/08; H04L 29/26; G06K 9/00892
See application file for complete search history.

(56) References Cited

U.S. PATENT DOCUMENTS

| | | | |
|---|---|---|---|
| 9,357,034 B2 * | 5/2016 | Kumar | G06F 9/5072 |
| 2012/0151057 A1 * | 6/2012 | Paredes | H04L 12/4641 709/225 |
| 2013/0086234 A1 * | 4/2013 | Salsburg | H04L 12/6418 709/223 |
| 2013/0283364 A1 * | 10/2013 | Chang | H04L 49/70 726/12 |
| 2014/0359693 A1 * | 12/2014 | Lemke | H04L 63/0263 726/1 |
| 2015/0281356 A1 * | 10/2015 | Maturana | H04L 67/1097 709/217 |
| 2016/0088023 A1 * | 3/2016 | Handa | G06F 17/30899 726/1 |
| 2016/0164914 A1 * | 6/2016 | Madhav | H04L 63/20 |
| 2016/0366130 A1 * | 12/2016 | Jung | H04L 63/08 |
| 2017/0063989 A1 * | 3/2017 | Langouev | H04L 49/90 |

* cited by examiner

*Primary Examiner* — Khalil Naghdali
*Assistant Examiner* — Shaqueal D Wade
(74) *Attorney, Agent, or Firm* — Brian J. Colandreo; Mark H. Whittenberger; Holland & Knight LLP

(57) ABSTRACT

A public-private computing system includes: a public computing portion accessible to a computing device associated with a user, the public computing portion including a Platform-as-a-Service portion, the Platform-as-a-Service portion including a cloud computing platform; a private computing portion; and an Application Program Interface (API) gateway configured to couple the public computing portion and the private computing portion.

14 Claims, 3 Drawing Sheets

PUBLIC-PRIVATE COMPUTING SYSTEM

TECHNICAL FIELD

This disclosure relates to computing systems and, more particularly, to public-private computer systems.

BACKGROUND

Storing and safeguarding electronic content is of paramount importance in modern business. Accordingly, various systems may be employed to protect such electronic content, wherein the use of redundant high-availability computing systems is increasing in popularity.

As would be expected, such redundant high-availability computing systems are often custom configured in accordance with the needs of a particular client. Further and due to their expense, it is desirable to not "over buy" these redundant high-availability computing system and purchase only what is needed now (and in the foreseeable future). Accordingly, configuration & estimation tools may be used to determine the needs of such clients and map those needs onto an actual redundant high-availability computing system, wherein these configuration & estimation tools are often network based computing systems in their own right.

SUMMARY OF DISCLOSURE

In one implementation, a public-private computing system includes: a public computing portion; a private computing portion; and an Application Program Interface (API) gateway configured to couple the public computing portion and the private computing portion.

One or more of the following features may be included. The public computing portion may include a public firewall for isolating the public computing portion from external devices. The public computing portion may further include a proxy server for authentication users of the public computing portion. The public computing portion may further include a Platform-as-a-Service portion. The public computing portion may further include an intermediate firewall for isolating the proxy server from the Platform-as-a-Service portion. The Platform-as-a-Service portion may include a cloud computing platform. The public computing portion may further include a core firewall for isolating the Platform-as-a-Service portion from the API gateway. The cloud computing platform may be configured to manage one or more APIs configured to access API gateway. The public computing portion may be configured to execute one or more virtual machines. The private computing portion may include an Infrastructure-as-a-Service portion. The Infrastructure-as-a-Service portion may include one or more applications servers. The Infrastructure-as-a-Service portion may include at least one database server. The API gateway may include configured to allow the public computing portion to access the private computing portion on behalf of a user of the public computing portion.

In another implementation, a public-private computing system includes: a public computing portion including a Platform-as-a-Service portion; a private computing portion including an Infrastructure-as-a-Service portion; and an API gateway configured to couple the public computing portion and the private computing portion and configured to allow the public computing portion to access the private computing portion on behalf of a user of the public computing portion.

One or more of the following features may be included. The Platform-as-a-Service portion may include a cloud computing platform. The cloud computing platform may be configured to manage one or more APIs configured to access API gateway. The public computing portion may be configured to execute one or more virtual machines. The Infrastructure-as-a-Service portion may include one or more applications servers. The Infrastructure-as-a-Service portion may include at least one database server.

In another implementation, a public-private computing system includes: a public computing portion including a Platform-as-a-Service portion, wherein the Platform-as-a-Service portion includes a cloud computing platform; a private computing portion configured to execute one or more virtual machines and including an Infrastructure-as-a-Service portion, wherein the Infrastructure-as-a-Service portion includes: one or more applications servers and at least one database server; and an API gateway configured to couple the public computing portion and the private computing portion and configured to allow the public computing portion to access the private computing portion on behalf of a user of the public computing portion.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
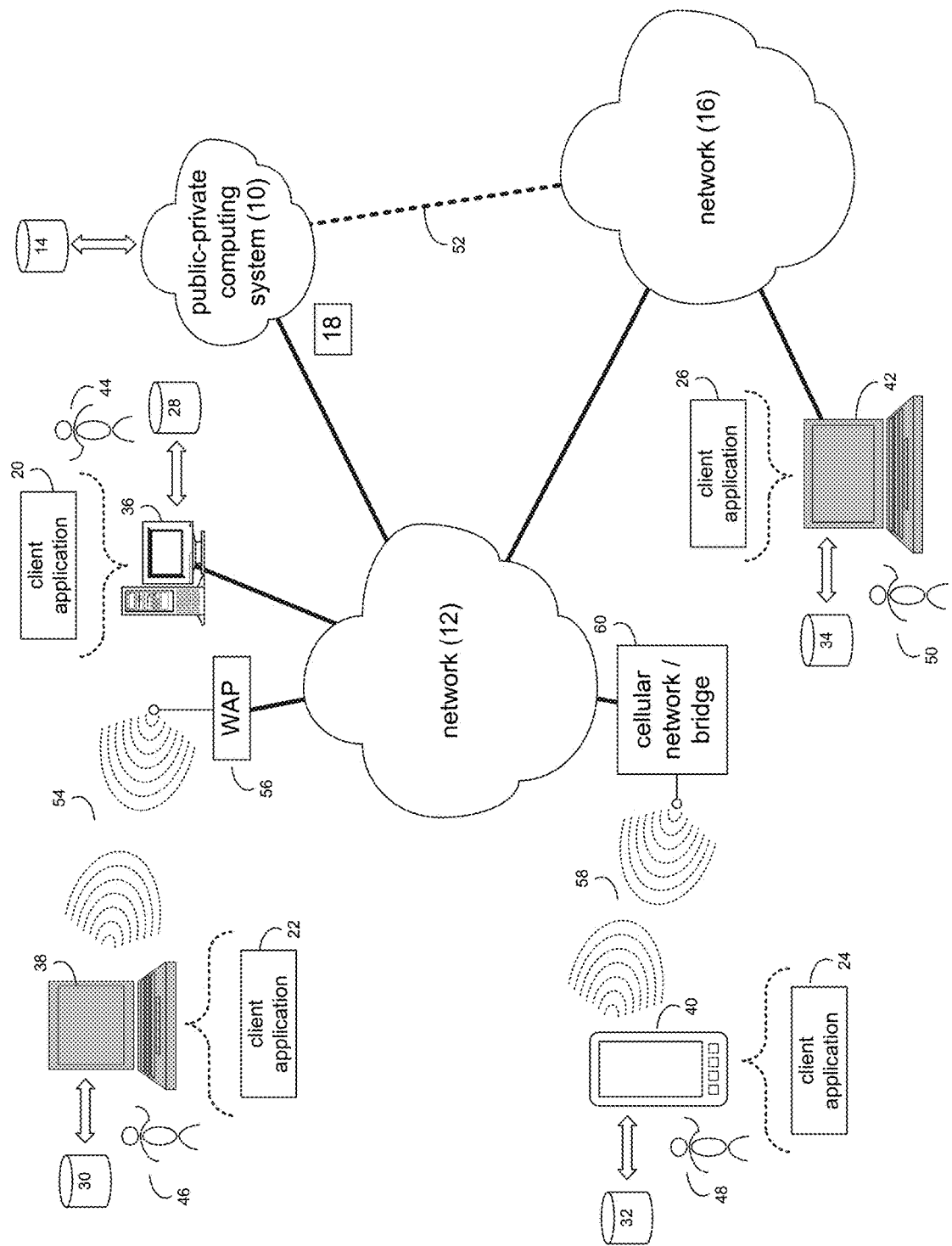
FIG. 1 is a diagrammatic view of a public-private computing system coupled to a distributed computing network.

System Overview:

Referring to FIG. 1, there is shown public-private computing system 10 that may be connected to network 12 (e.g., the Internet or a local area network). The various components of public-private computing system 10 may execute one or more operating systems, examples of which may include but are not limited to: Microsoft Windows™; Linux™, Unix, or a custom operating system, for example.

The instruction sets and subroutines of the various components of public-private computing system 10, which may be stored on storage device 14 included within public-private computing system 10, may be executed by one or more processors (not shown) and one or more memory architectures (not shown) included within public-private computing system 10. Storage device 14 may include but is not limited to: a hard disk drive; a RAID device; a random access memory (RAM); a read-only memory (ROM); and all forms of flash memory storage devices.

Network 12 may be connected to one or more secondary networks (e.g., network 16), examples of which may include but are not limited to: a local area network; a wide area network; or an intranet, for example.

Various information (e.g. information 18) may be sent from client applications 20, 22, 24, 26 to public-private computing system 10. Examples of information 18 may include but are not limited to data write requests (i.e. a request that content be written to public-private computing system 10), data read requests (i.e. a request that content be read from public-private computing system 10), outbound information (i.e. information that is provided to client applications 20, 22, 24, 26 from public-private computing system 10), and inbound information (i.e. information that is provided to public-private computing system 10 from client applications 20, 22, 24, 26).

The instruction sets and subroutines of client applications 20, 22, 24, 26, which may be stored on storage devices 28, 30, 32, 34 (respectively) coupled to client electronic devices 36, 38, 40, 42 (respectively), may be executed by one or more processors (not shown) and one or more memory architectures (not shown) incorporated into client electronic devices 36, 38, 40, 42 (respectively). Storage devices 28, 30, 32, 34 may include but are not limited to: hard disk drives; RAID devices; random access memories (RAM); read-only memories (ROM), and all forms of flash memory storage devices. Examples of client electronic devices 36, 38, 40, 42 may include, but are not limited to, personal computer 36, laptop computer 38, smartphone 40, notebook computer 42, a server (not shown), a personal digital assistant (not shown), and a dedicated network device (not shown).

Users 44, 46, 48, 50 may access public-private computing system 10 directly through network 12 or through secondary network 16. Further, public-private computing system 10 may be connected to network 12 through secondary network 16, as illustrated with link line 52.

The various client electronic devices may be directly or indirectly coupled to network 12 (or network 16). For example, personal computer 36 is shown directly coupled to network 12 via a hardwired network connection. Further, notebook computer 42 is shown directly coupled to network 16 via a hardwired network connection. Laptop computer 38 is shown wirelessly coupled to network 12 via wireless communication channel 54 established between laptop computer 38 and wireless access point (i.e., WAP) 56, which is shown directly coupled to network 12. WAP 56 may be, for example, an IEEE 802.11a, 802.11b, 802.11g, 802.11n, Wi-Fi, and/or Bluetooth device that is capable of establishing wireless communication channel 54 between laptop computer 38 and WAP 56. Smartphone 40 is shown wirelessly coupled to network 12 via wireless communication channel 58 established between smart phone 40 and cellular network/bridge 60, which is shown directly coupled to network 12.

Client electronic devices 36, 38, 40, 42 may each execute an operating system, examples of which may include but are not limited to Microsoft Windows", Linux", or a custom operating system.

For illustrative purposes only, public-private computing system 10 will be described as being a network-based public-private computing system that includes a plurality of discrete computing devices. However, this is for illustrative purposes only and is not intended to be a limitation of this disclosure, as other configurations are possible and are considered to be within the scope of this disclosure.

Further and for illustrative purposes only, public-private computing system 10 will be described as being a network-based configuration & estimation tool that may be accessed and used by users 44, 46, 48, 50 to determine the computing systems needs of their clients/customers and map those needs onto a redundant high-availability computing system.

Figure 2:
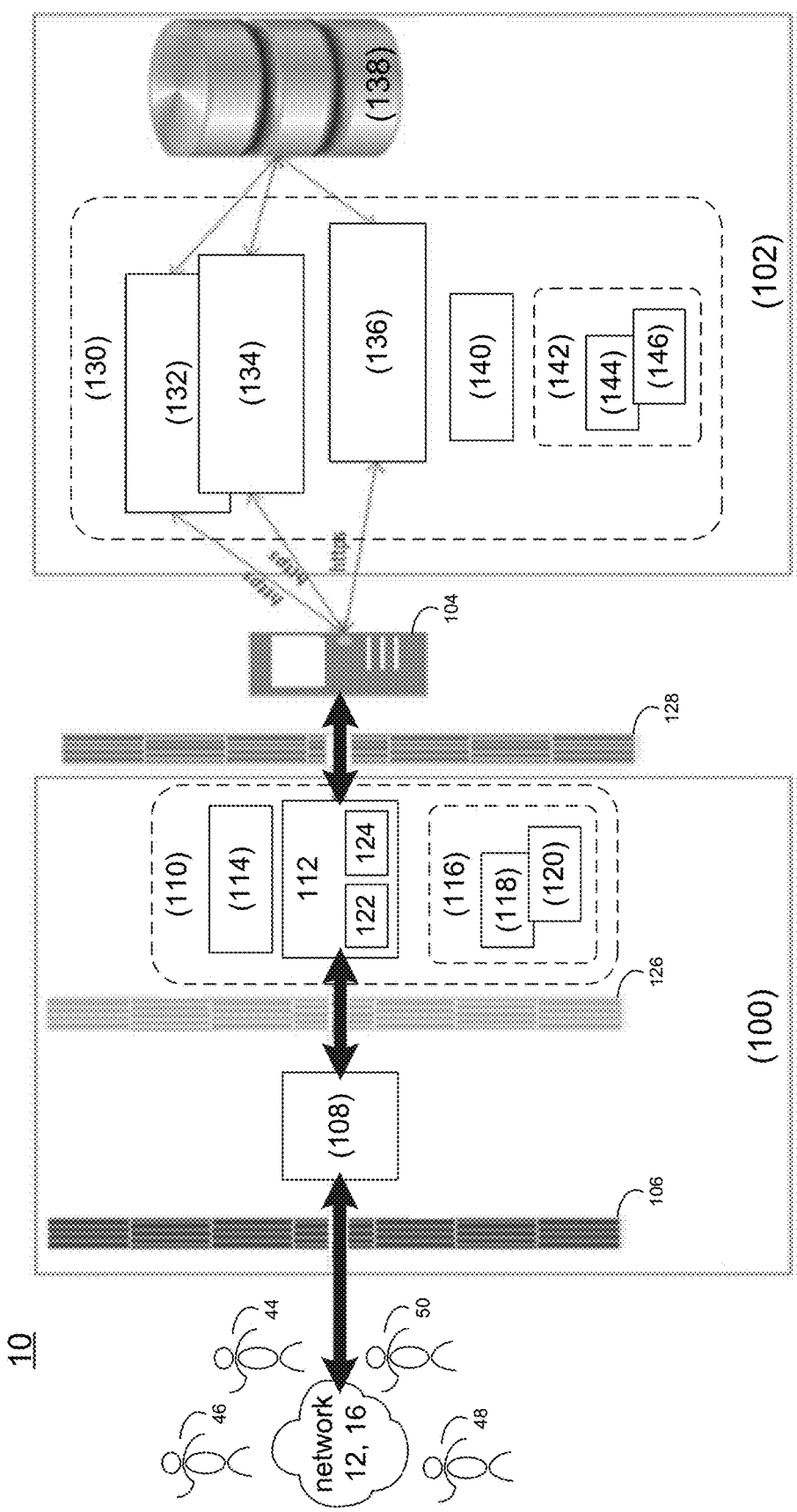
FIG. 2 is a diagrammatic view of the public-private computing system of FIG. 1.

Referring also to FIG. 2, there is shown one implementation of public-private computing system 10. In this implementation, public-private computing system 10 may include public computing portion 100 and private computing portion 102. Public-private computing system 10 may also include API gateway 104 that may be configured to couple public computing portion 100 and private computing portion 102.

Public Computing Portion:

Public computing portion 100 may include public firewall 106 that may be configured to isolate public computing portion 100 from external devices and external networks. Public computing portion 100 may further include proxy server 108 configured to authenticate users (e.g., users 44, 46, 48, 50) of public computing portion 100. Examples of proxy server 108 may include but is not limited to an Apache™ reverse proxy server. As is known in the art, a reverse proxy server is a type of proxy server that may be configured to retrieve resources (e.g., database resources) on behalf of users (e.g., users 44, 46, 48, 50) from one or more servers (e.g., included within public computing portion 100 and/or private computing portion 102), wherein these resources may then be returned to the users (e.g., users 44, 46, 48, 50) as if they originated from the proxy server itself.

Public-private computing system 10 may further include Platform-as-a-Service (PaaS) portion 110. Platform as a service (PaaS) portion 110 may be a category of cloud computing services that may provide a platform that allows for the development, running, and management of applications without the complexity of building and maintaining the infrastructure typically associated with developing and launching these applications. Platform-as-a-Service (PaaS) portion 110 may be delivered as a public service from a provider, wherein the consumer may control software deployment with minimal configuration options, and the cloud provider may provide the physical networks, the computer server(s), the data storage, the operating system (s), the "middleware" (e.g. Java runtime, .NET runtime, integration, etc.), and the database (and other) services required to host the consumer's application. Alternatively, Platform-as-a-Service (PaaS) portion 110 may be delivered as a private service (e.g., as software or an appliance) inside of a firewall.

Platform-as-a-Service portion 110 may include cloud computing platform 112, an example of which may include but is not limited to Cloud Foundry™. Cloud Foundry™ is an open source cloud computing platform (originally developed in-house at VMware™ and is currently owned by Pivotal Software™ (which is a joint venture of VMware™, EMC™, and General Electric™). Cloud Foundry™ may be optimized to deliver fast application development and deployment.

Platform-as-a-Service portion 110 may further include virtualization system 114 (e.g., a virtualization appliance and/or software) that may allow users (e.g., users 44, 46, 48, 50) to access services offered by Platform-as-a-Service portion 110 and/or public computing portion 100. Virtualization system 114 may execute virtual machine operating environment 116. An example of virtual machine operating environment 116 may include but is not limited to a hypervisor, which is an instantiation of an operating system that may allow for one or more virtual machines (e.g., virtual machine 118, 120) to operate within public computing portion 100. Accordingly, the combination of virtualization system 114, virtual machine operating environment 116, and virtual machines 118, 120 may allow one or more users (e.g., users 44, 46, 48, 50) to access the resources of public computing portion 100. Further, cloud computing platform 112 may be configured to manage one or more APIs (e.g., APIs 122, 124) configured to access API gateway 104.

Public computing portion 100 may further include intermediate firewall 126 (e.g., that may be configured to isolate proxy server 108 from Platform-as-a-Service portion 110) and core firewall 128 (e.g., that may be configured to isolate Platform-as-a-Service portion 110 from API gateway 104).

Private Computing Portion:

Private computing portion 102 may include Infrastructure-as-a-Service portion 130. Infrastructure as a Service (IaaS) portion 130 may be a form of cloud computing that may provide virtualized computing resources over a network. Infrastructure-as-a-Service portion 130 may include one or more applications servers (e.g., application servers 132, 134, 136) and/or at least one database server (e.g., database server 138) for providing one or more services to the users (e.g., users 44, 46, 48, 50).

Infrastructure as a Service (IaaS) portion 130 may further include virtualization system 140 (e.g., a virtualization appliance and/or software) that may allow users (e.g., users 44, 46, 48, 50) to access services offered by Infrastructure as a Service (IaaS) portion 130 and/or private computing portion 102. Virtualization system 140 may execute virtual machine operating environment 142. An example of virtual machine operating environment 142 may include but is not limited to a hypervisor, which is an instantiation of an operating system that may allow for one or more virtual machines (e.g., virtual machine 144, 146) to operate within private computing portion 102. Accordingly, the combination of virtualization system 140, virtual machine operating environment 142, and virtual machines 144, 146 may allow one or more users (e.g., users 44, 46, 48, 50) to access the resources of private computing portion 102.

API Gateway:

API gateway 104 may be configured to allow public computing portion 100 to access private computing portion 102 on behalf of a user (e.g., user 44, 46, 48, 50) of public computing portion 100.

As discussed above and as will be discussed below in greater detail, cloud computing platform 112 (within public computing portion 100) may be configured to manage one or more APIs (e.g., APIs 122, 124) configured to access API gateway 104. Accordingly, once users (e.g., users 44, 46, 48, 50) gain access to public computing portion 100 generally (and cloud computing platform 112 specifically), the one or more APIs (e.g., APIs 122, 124) managed by cloud computing platform 112 (within public computing portion 100) may be used to access API gateway 104, which (as discussed above) may be configured to allow public computing portion 100 to access private computing portion 102 on behalf of a user (e.g., user 44, 46, 48, 50) of public computing portion 100.

Figure 3:
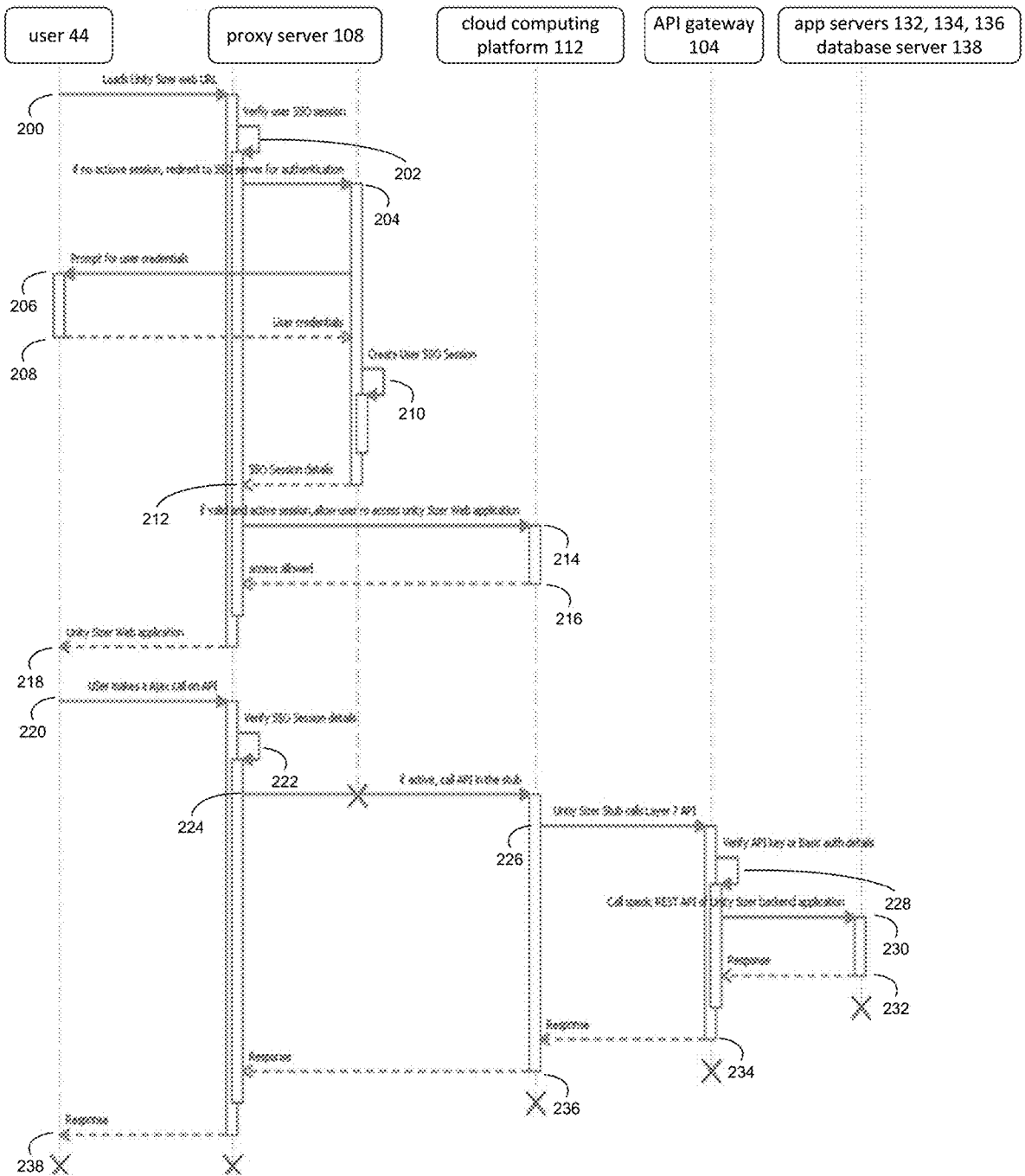
FIG. 3 is a temporal timeline of one implementation of a procedure for accessing the public-private computing system of FIG. 1.

Operation of Public-Private Computing System:

Referring also to FIG. 3, the operation of public-private computing system 10 is shown. As discussed above, public-private computing system 10 may be a network-based configuration & estimation tool that may be accessed and used by users 44, 46, 48, 50 to determine the computing systems needs of their clients/customers and map those needs onto a redundant high-availability computing system.

For the following example, assume that user 44 is using public-private computing system 10 to determine the computing system needs of their client and to identify a proposed redundant high-availability computing system that would serve those needs. And the following example is intended to be illustrative but not definitive. Accordingly, the following example is intended to be one example of the manner in which public-private computing system 10 may be utilized and is not intended to be a limitation of this disclosure, as other configurations and methods of utilization are possible and are considered to be within the scope of this disclosure.

Accordingly, user 44 may visit a website (e.g., www.unitysizer.emc.com) to access public-private computing system 10 so that the computing system needs of the client of user 44 may be mapped onto a proposed redundant high-availability computing system. (as shown in step 200).

Proxy server 108 of public-private computing system 10 may determine if an active session for user 44 exists (as shown in step 202). If an active session for user 44 does exist, a new session is not needed. However, if an active session for user 44 does not exist, a new session may be generated by sending the appropriate information to a single sign on (SSO) service operating on proxy server 108 for authentication (as shown in step 204).

Once a session is established, proxy server 108 may prompts user 44 for a user name and a password (as shown in step 206), in response to which user 44 may enter their user credentials (as shown in step 208) and the single sign on (SSO) service operating on proxy server 108 may create a session (as shown in step 210).

Once a session is established, the single sign on (SSO) service operating on proxy server 108 may provide session details to proxy server 108 (as shown in step 212), wherein examples of these session details may include but are not limited to hash codes, cookies, etc. Assuming that the session is valid and active, access may be granted to user 44, thus allowing user 44 to access the services and applications of public-private computing system 10.

Accordingly, proxy server 108 may inform cloud computing platform 112 that a successful sessions was established for user 44 (as shown in step 214), to which cloud computing platform 112 may notify proxy server 108 that access was granted (as shown in step 216), to which proxy server 108 may notify user 44 that access was granted (as shown in step 218).

Accordingly, user 44 may now begin the process of defining the computing system needs of their client so that these needs may be mapped onto a proposed redundant high-availability computing system. Accordingly user 44 may define these need by e.g., specifying required storage space, required network bandwidth, required computational bandwidth and projected yearly growth; and this information may be submitted to public-private computing system 10 (as shown in step 220) and the single sign on (SSO) service operating on proxy server 108 may verify the session details (as shown in step 222).

If the session details are confirmed and the session is still active, cloud computing platform 112 may be accessed (as shown in step 224) since, as discussed above, cloud computing platform 112 may be configured to manage one or more APIs (e.g., APIs 122, 124) configured to access API gateway 104.

Cloud computing platform 112 may use the appropriate credentials to access API gateway 104 via one or more of APIs 122, 124 (as shown in step 226), wherein API gateway 104 may confirm these credentials (as shown in step 228). Once confirmed, access to applications servers 132, 134, 136 and database server 138 may be granted (as shown in step 230). Applications servers 132, 134, 136 and database server 138 may analyze the information provided by user 44 (e.g., required storage space, required network bandwidth, required computational bandwidth and projected yearly growth) and may generate a result set (e.g., a proposed redundant high-availability computing system). This result set may be provided to API gateway 114 (as shown in step 232), which may provide it to cloud computing platform 112

(as shown in step 234), which may provide it to proxy server 108 (as shown in step 236), which may provide it to user 44 (as shown in step 238).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A public-private computing system comprising:
    a public computing portion accessible to a computing device associated with a user, the public computing portion including a Platform-as-a-Service portion, wherein the Platform-as-a-Service portion includes a cloud computing platform;
    a private computing portion, the private computing portion including an Infrastructure-as-a-Service portion, wherein the Infrastructure-as-a-Service portion includes a virtualization system configured to execute a virtual machine environment, wherein the virtual machine environment includes one or more virtual machines configured to operate within the private computing portion, and wherein a combination of the virtualization system, the virtual machine environment, and the one or more virtual machines operating within the private computing portion is configured to allow one or more users to access a plurality of resources associated with the private computing portion; and
    an Application Programming Interface (API) gateway configured to couple the public computing portion and the private computing portion;
    wherein the cloud computing platform is configured to manage one or more APIs configured to access the API gateway, wherein the one or more APIs access the API gateway in response to a request received by the public computing portion from the computing device associated with the user.

2. The public-private computing system of claim 1 wherein the public computing portion includes a public firewall for isolating the public computing portion from external devices.

3. The public-private computing system of claim 2 wherein the public computing portion further includes a proxy server for authentication users of the public computing portion.

4. The public-private computing system of claim 1 wherein the public computing portion further includes an intermediate firewall for isolating a proxy server from the Platform-as-a-Service portion.

5. The public-private computing system of claim 1 wherein the public computing portion further includes a core firewall for isolating the Platform-as-a-Service portion from the API gateway.

6. The public-private computing system of claim 1 wherein the public computing portion is configured to execute one or more virtual machines.

7. The public-private computing system of claim 1 wherein the Infrastructure-as-a-Service portion includes one or more applications servers.

8. The public-private computing system of claim 1 wherein the Infrastructure-as-a-Service portion includes at least one database server.

9. The public-private computing system of claim 1 wherein the API gateway is configured to allow the public computing portion to access the private computing portion on behalf of a user of the public computing portion.

10. A public-private computing system comprising:
    a public computing portion accessible to a computing device associated with a user, the public computing portion including a Platform-as-a-Service portion, wherein the Platform-as-a-Service portion includes a cloud computing platform;
    a private computing portion, the private computing portion including an Infrastructure-as-a-Service portion, wherein the Infrastructure-as-a-Service portion includes a virtualization system configured to execute a virtual machine environment, wherein the virtual machine environment includes one or more virtual machines configured to operate within the private computing portion, and wherein a combination of the virtualization system, the virtual machine environment, and the one or more virtual machines operating within the private computing portion is configured to allow one or more users to access a plurality of resources associated with the private computing portion; and
    an Application Programming Interface (API) gateway configured to couple the public computing portion and the private computing portion;
    wherein the cloud computing platform is configured to manage one or more APIs configured to access the API gateway, wherein the one or more APIs access the API gateway to allow the public computing portion to access the private computing portion on behalf of a user of the public computing portion in response to a request received by the public computing portion from the computing device associated with the user.

11. The public-private computing system of claim 10 wherein the public computing portion is configured to execute one or more virtual machines.

12. The public-private computing system of claim 10 wherein the infrastructure-as-a-Service portion includes one or more applications servers.

13. The public-private computing system of claim 10 wherein the Infrastructure-as-a-Service portion includes at least one database server.

14. A public-private computing system comprising:
    a public computing portion accessible to a computing device associated with a user, the public computing portion including a Platform-as-a-Service portion, wherein the Platform-as-a-Service portion includes a cloud computing platform;
    a private computing portion, the private computing including an Infrastructure-as-a-Service portion, wherein the Infrastructure-as-a-Service portion includes a virtualization system configured to execute a virtual machine environment, wherein the virtual machine environment includes one or more virtual machines configured to operate within the private computing portion, and wherein a combination of the virtualization system, the virtual machine environment, and the one or more virtual machines operating within the private computing portion is configured to allow one or more users to access a plurality of resources associated with the private computing portion, wherein the Infrastructure-as-a-Service portion includes:
        one or more applications servers, and at least one database server; and an Application Programming Interface (API) gateway configured to couple the public computing portion and the private computing portion;

wherein the cloud computing platform is configured to manage one or more APIs configured to access the API gateway, wherein the one or more APIs access the API gateway to allow the public computing portion to access the private computing portion on behalf of a user of the public computing portion in response to a request received by the public computing portion from the computing device associated with the user.

* * * * *